(12) United States Patent
Lively et al.

(10) Patent No.: US 10,632,426 B2
(45) Date of Patent: Apr. 28, 2020

(54) HOLLOW FIBER MEMBRANES FOR SOLUBILIZING A GAS INTO A LIQUID, DEVICES FOR SAME, AND PROCESSES OF SAME

(71) Applicant: Georgia Tech Research Corporation, Atlanta, GA (US)

(72) Inventors: Ryan P. Lively, Atlanta, GA (US); Aklilu T. G. Giorges, Atlanta, GA (US); Dong-Yeun Koh, Atlanta, GA (US); Robert Wallace, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 126 days.

(21) Appl. No.: 15/567,328

(22) PCT Filed: Apr. 15, 2016

(86) PCT No.: PCT/US2016/027819
§ 371 (c)(1),
(2) Date: Oct. 17, 2017

(87) PCT Pub. No.: WO2016/168644
PCT Pub. Date: Oct. 20, 2016

(65) Prior Publication Data
US 2018/0147544 A1     May 31, 2018

Related U.S. Application Data

(60) Provisional application No. 62/149,169, filed on Apr. 17, 2015.

(51) Int. Cl.
*B01D 67/00*     (2006.01)
*B01D 69/02*     (2006.01)
(Continued)

(52) U.S. Cl.
CPC ........ *B01D 67/0093* (2013.01); *B01D 69/02* (2013.01); *B01D 69/08* (2013.01);
(Continued)

(58) Field of Classification Search
CPC .... B01D 67/0093; B01D 71/34; B01D 69/02; B01D 71/36; B01D 69/08; B01D 2325/38; B01D 2325/04; C08L 27/18; C08L 27/16
See application file for complete search history.

(56) References Cited

U.S. PATENT DOCUMENTS 5,695,702 A * 12/1997 Niermeyer ............. B01D 63/02
                                                264/129
6,146,747 A     11/2000   Wang et al.
(Continued)

FOREIGN PATENT DOCUMENTS

CN         102166584        8/2011
EP         2745918 A1 *   6/2014  ........ B01F 3/04262

OTHER PUBLICATIONS

International Preliminary Report on Patentability for related International Patent Application No. PCT/US2016/027819 dated Oct. 17, 2017.
(Continued)

*Primary Examiner* — Pamela H Weiss
(74) *Attorney, Agent, or Firm* — Troutman Sanders LLP; Ryan A. Schneider

(57) ABSTRACT

A hollow fiber membrane is disclosed that includes both a porous hollow fiber and a nonporous film coating. The hollow fiber membrane is suitable for use in solubilizing gases into liquids. This can include for example carbonation of an aqueous liquid by $CO_2$ gas. Systems, methods, and devices are disclosed.

13 Claims, 11 Drawing Sheets

(51) Int. Cl.
*B01D 71/34* (2006.01)
*B01D 71/36* (2006.01)
*B01D 69/08* (2006.01)
*C08L 27/16* (2006.01)
*C08L 27/18* (2006.01)

(52) U.S. Cl.
CPC ............. *B01D 71/34* (2013.01); *B01D 71/36* (2013.01); *B01D 2325/04* (2013.01); *B01D 2325/38* (2013.01); *C08L 27/16* (2013.01); *C08L 27/18* (2013.01)

(56) References Cited

U.S. PATENT DOCUMENTS

| | | | |
|---|---|---|---|
| 6,164,632 A | 12/2000 | Uchida et al. | |
| 6,354,444 B1 | 3/2002 | Mahendran et al. | |
| 6,582,496 B1* | 6/2003 | Cheng | B01D 53/22 95/45 |
| 6,921,482 B1 | 7/2005 | Cheng et al. | |
| 8,540,081 B2 | 9/2013 | Jerman et al. | |
| 8,568,517 B2 | 10/2013 | Nair et al. | |
| 2008/0156191 A1* | 7/2008 | Parekh | B01D 19/0031 95/211 |
| 2010/0264012 A1* | 10/2010 | Yang | B01D 3/14 203/42 |
| 2011/0114559 A1* | 5/2011 | Fislage | B01D 53/22 210/648 |
| 2011/0239865 A1* | 10/2011 | Huang | B01D 69/08 96/6 |
| 2012/0074054 A1* | 3/2012 | Burr | B01D 63/022 210/323.2 |
| 2013/0112618 A1* | 5/2013 | Diallo | B01D 71/76 210/641 |
| 2013/0213881 A1* | 8/2013 | Diallo | D01F 1/10 210/500.23 |
| 2013/0280151 A1* | 10/2013 | Lee | B01D 53/62 423/226 |
| 2015/0053610 A1* | 2/2015 | Diallo | B01D 67/0079 210/500.23 |
| 2016/0008753 A1* | 1/2016 | Corcoran, Jr. | C07C 2/76 95/96 |
| 2016/0089638 A1* | 3/2016 | Schuster | B01D 61/364 210/500.23 |
| 2016/0106296 A1* | 4/2016 | Cai | B01D 63/02 134/98.1 |

OTHER PUBLICATIONS

Search Report and Written Opinion from related PCT Application No. PCT/US16/027819 dated Jul. 14, 2016.

* cited by examiner

HOLLOW FIBER MEMBRANES FOR SOLUBILIZING A GAS INTO A LIQUID, DEVICES FOR SAME, AND PROCESSES OF SAME

CROSS-REFERENCE TO RELATED APPLICATIONS

This application, filed Apr. 15, 2016 claims the benefit of U.S. Provisional Patent Application Ser. No. 62/149,169, filed Apr. 17, 2015, entitled "Hydrophobic Hollow Fiber Membrane Carbonation System," the entire contents and substance of which are hereby incorporated by reference as if fully set forth below.

TECHNICAL FIELD

The various embodiments of the disclosure relate generally to hollow fiber membranes, solubilizing a gas into a liquid using the hollow fiber membranes, and processes, methods, and systems for the same. It is particularly useful for constructing contactors that will efficiency solubilize a gas into a liquid under solution diffusion conditions rather than mechanical processing.

BACKGROUND

Carbonated drinks account for a substantial portion of the commercial beverages sold every day. Worldwide sales of Coca Cola beverages alone is an estimated 1.7 billion servings daily. The processes used to produce these carbonated beverages traditionally relies on mechanical type processes, such as McCann carbonators, jet mixers, and pressurized vessels. These processes are typically run in batch or semi-batch operations, and can be limiting in terms of process handling and controls.

At the center of each of these carbonation techniques is the requirement that a gas dissolve or solubilize into a liquid. Carbonation specifically refers to the dissolution of carbon dioxide into a liquid, but other gases are similarly dissolved into a liquid. In any instance of this dissolution, the goal of the mechanical process is to produce air bubbles that are small enough to reach the diffusion limits of its overall surface area in contrast to the volume of the bubble; in other words, making air bubbles small enough that the surface area to volume ratio reaches a maximum for complete diffusion of the bubble. Mechanical mixtures currently used cannot reach that limitation, and cannot do so in a continuous process.

BRIEF SUMMARY

The various embodiments of the disclosure relate generally to processes, methods, and systems for solubilizing a gas into a liquid, and hollow fiber membranes for the same.

An embodiment of the disclosure can be a hollow fiber membrane containing a porous hollow fiber and a non-porous perfluorinated film coating at least one of the inside or outside of the hollow fiber. The hollow fiber can have a lumen extending through the fiber, an inner diameter within the lumen, an outer diameter across the fiber, and a wall thickness.

Another embodiment of the disclosure can be a system for solubilizing a liquid with a gas. The system can include a hollow fiber membrane contact module having a bundle of mesoporous hollow fiber membranes, each of the hollow fibers membranes having an outer surface and an inner lumen, and each comprising a perfluorinated compound and a non-porous perfluorinated film, wherein the non-porous perfluorinated film covers at least one of the outside surface or the lumen surface of the hollow fiber. The system can also include a shell surrounding the bundle of mesoporous hollow fibers, where a shell side is defined by the shell and outer surfaces of each of the hollow fibers, and a lumen side defined by the inner lumen of each of the hollow fibers. The system can also include a gas source for supplying pressurized gas to the lumen side of the contact module; and a liquid source for supplying liquid to the shell side of the contact module.

Another embodiment of the disclosure can be a method for solubilizing a liquid with a gas, which can included providing a hollow fiber membrane, contacting a pressurized gas through the lumen of the fiber membrane; and contacting a liquid with outer shell of the fiber membrane. The pressurized gas can permeate the perfluorinated film and diffuses through the mesoporous hollow fibers to solubilize within the liquid.

Another embodiment of the disclosure can be a method for solubilizing a liquid with a gas, which can include providing a hollow fiber membrane contact module, contacting a pressurized gas with the lumen side of the contact module; and contacting a liquid with the shell side of the contact module. The pressurized gas can permeate each of the perfluorinated films before diffusing through each of the mesoporous hollow fibers and solubilizing within the liquid on the shell side of the contact module.

In some embodiments, the hollow fiber can be a perfluorinated compound, and can be polyvinylidene difluoride. The non-porous perfluorinated film can be permeable, and can be a perfluorinated film, such as polytetrafluoroethylene (PTFE).

In some embodiments, the non-porous perfluorinated film can have a thickness of about 50 to about 200 nm. The non-porous perfluorinated film can also have a thickness of about 75 to about 150 nm.

In some embodiments, the mesoporous hollow fiber can have an inner diameter of about 75 to about 200 micrometers. The mesoporous hollow fiber can have an outer diameter of about 150 to about 400 micrometers. The mesoporous hollow fiber can have a wall thickness of about 25 to about 100 micrometers. The mesoporous hollow fiber can have an average pore diameter of about 0.05 to about 3 micrometers.

In some embodiments, the mesoporous hollow fiber can have a hydrophobic perfluorinated polymer, a film thickness of 50 to 200 nanometers, an inner diameter of about 75 to about 200 micrometers, an outer diameter of about 150 to about 400 micrometers, a wall thickness of about 25 to about 100 micrometers, and an average pore diameter of about 0.05 to about 3 micrometers.

In some embodiments, the pressured gas can be carbon dioxide or nitrogen. The pressurized gas can be carbon dioxide. The gas can be pressurized in a range between 1 to 8 atm. In some embodiments, the liquid can be aqueous, or can be water.

DETAILED DESCRIPTION

Figure 1:
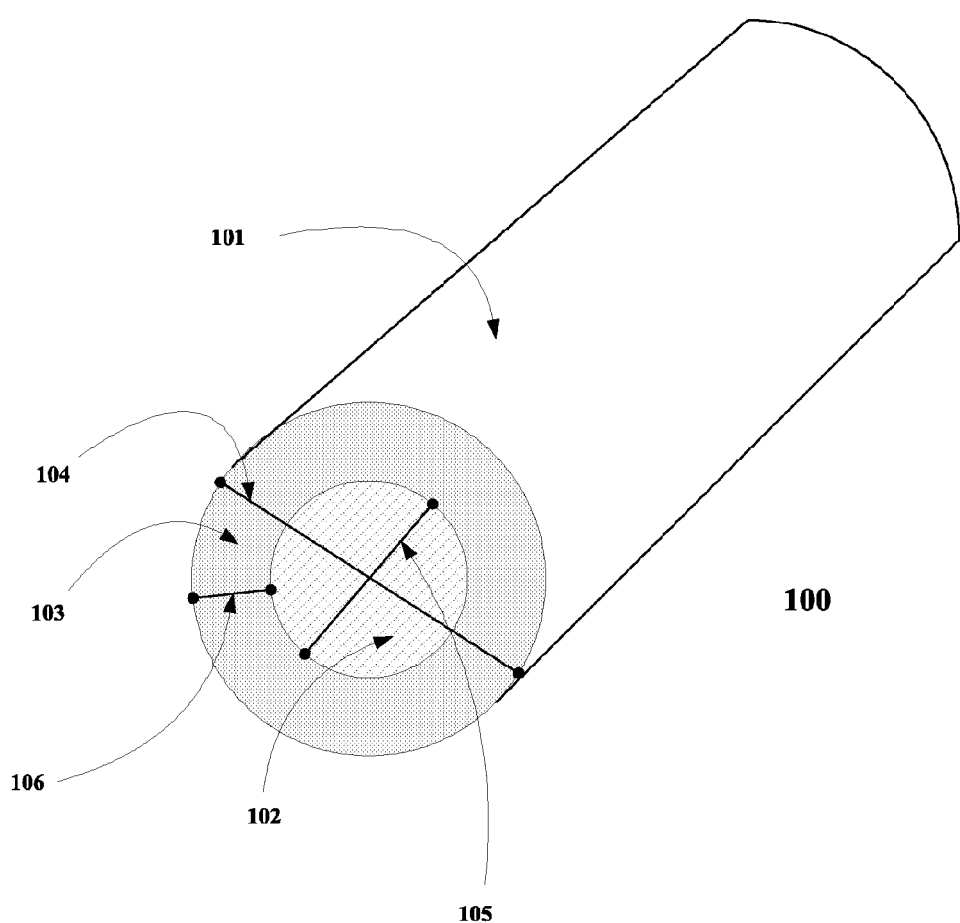
FIG. 1 illustrates a cross-sectional schematic of a hollow fiber, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosure is directed to hollow fiber membranes, and the application of hollow fiber membranes in solubilizing a gas in a liquid. One aspect of the disclosure is a hollow fiber membrane composed of a hollow fiber and a film coating the hollow fiber. The hollow fiber can be a porous hollow fiber, or a mesoporous hollow fiber. The film can coat the interior lumen of the hollow fiber, or the exterior or the hollow fiber. Because the hollow fiber membrane is composed of a hollow fiber and a film, it can also be referred to as a dual layer hollow fiber membrane.

The hollow fiber of the hollow fiber membrane can be described as having a lumen extending through the fiber, an inner diameter within the lumen, an outer diameter across the fiber, and a wall thickness of the hollow fiber. An exemplary cross-section of a hollow fiber 100 is shown in FIG. 1. Hollow fiber 100 includes an outer or external surface 101, a lumen or bore 102 having in inner surface, and a wall 103. The fiber can be described by the outer diameter 104, the inner diameter 105, and the wall thickness 106.

The hollow fiber can have a lumen extending through the fiber. The width of the lumen can be described as the inner diameter of the hollow fiber, as shown in FIG. 1. The inner diameter of the hollow fiber can be from about 50 micrometer to about 250 micrometers. The inner diameter can be at least about 50 micrometers, at least about 75 micrometers or at least about 100 micrometers. The inner diameter can be less than about 250 micrometers, less than about 200 micrometers, less than about 175 micrometers, or less than about 150 micrometers. The inner diameter can be about 75 to about 200 micrometers, about 75 to about 175 micrometers, about 75 to about 150 micrometers, or about 100 to about 200 micrometers.

The hollow fiber can have an outer diameter, which is the distance from one side of an external side of the fiber to an opposite external side of the fiber, as shown in FIG. 1. The outer diameter of the hollow fiber can be from about 100 micrometers to about 1000 micrometer. The outer diameter can be less than about 1000 micrometer, less than about 750 micrometers, or less than about 500 micrometers. The outer diameter can be less than about 450 micrometers, less than about 400 micrometers, or less than about 350 micrometers. The outer diameter can be greater than about 100 micrometers, greater than about 125 micrometers, greater than about 150 micrometers, greater than about 175 micrometers or greater than about 200 micrometers. The outer diameter can be about 100 micrometers to about 500 micrometers, about 150 micrometers to about 400 micrometers, or about 150 micrometers to about 350 micrometers.

The hollow fiber can also be described by the average wall thickness of the fiber. The wall thickness of the hollow fiber can be from about 10 to about 200 micrometers, from about 20 to about 150 micrometers, or from about 25 to about 100 micrometers. The wall thickness can be greater than about 15 micrometers, greater than about 20 micrometers, greater than about 25 micrometers, greater than about 30 micrometers, or greater than about 35 micrometers. The wall thickness can be less than about 150 micrometers, less than about 125 micrometers, less than about 100 micrometers.

The disclosure also includes a porous structure to the hollow fibers. The hollow fibers can be described as porous, or as mesoporous. As such, the hollow fibers can be described as porous hollow fibers, or mesoporous hollow fibers. The hollow fibers can have pore sizes of greater than zero to about 4 microns. The average pore size can be about 0.05 to about 3 microns, about 0.1 to about 3 microns, about 0.5 to about 3 microns, or about 0.5 to about 2.5 microns The porosity of the hollow fibers can also be described as asymmetrically porous. By asymmetrically porous is meant that the pore size can decrease in size as from the lumen side of the fiber to the outer surface of the fiber. This asymmetry can often be demonstrated by mercury porosimetry measurements, where mercury intrudes into the pores at certain pressures, and the pore sizes can be calculated based on the Young-Laplace equation. Based on the asymmetry of the pores, two groups of pores can be observed in hollow fibers, typically between about 50 to 500 nm and about 1 to 3 micrometer.

The hollow fiber can be composed of a fluorinated polymer, preferably a hydrophobic fluorinated polymer. The hollow fiber can be composed of polyvinylidene difluoride (PVDF.)

Figure 2A:
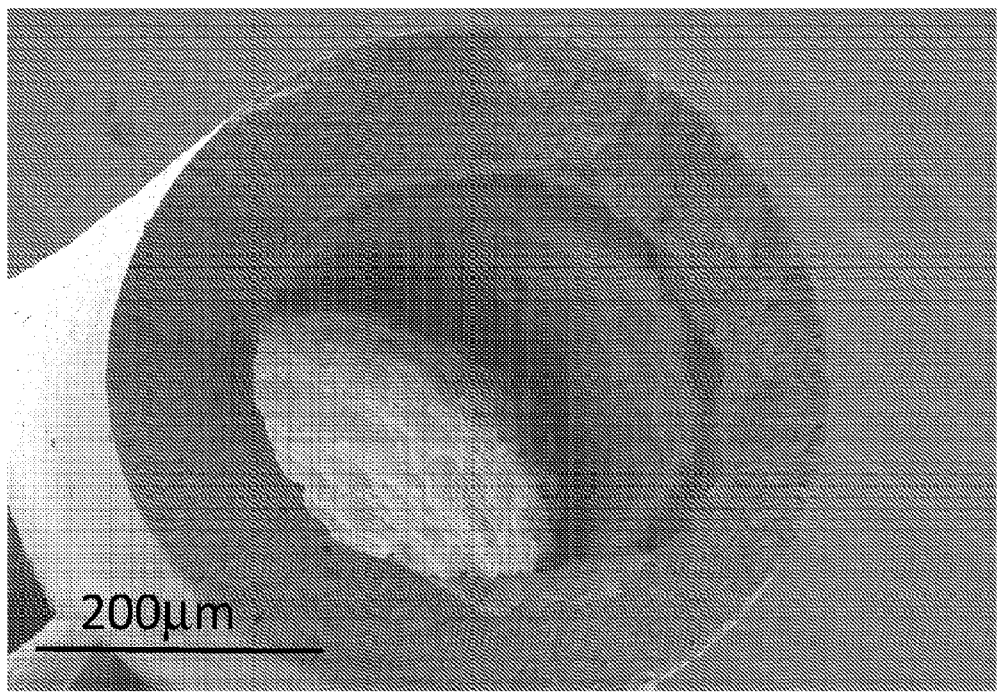
FIGS. 2A-2D illustrate SEM images of mesoporous hollow fibers, in accordance with an exemplary embodiment of the disclosure.
Figure 2B:
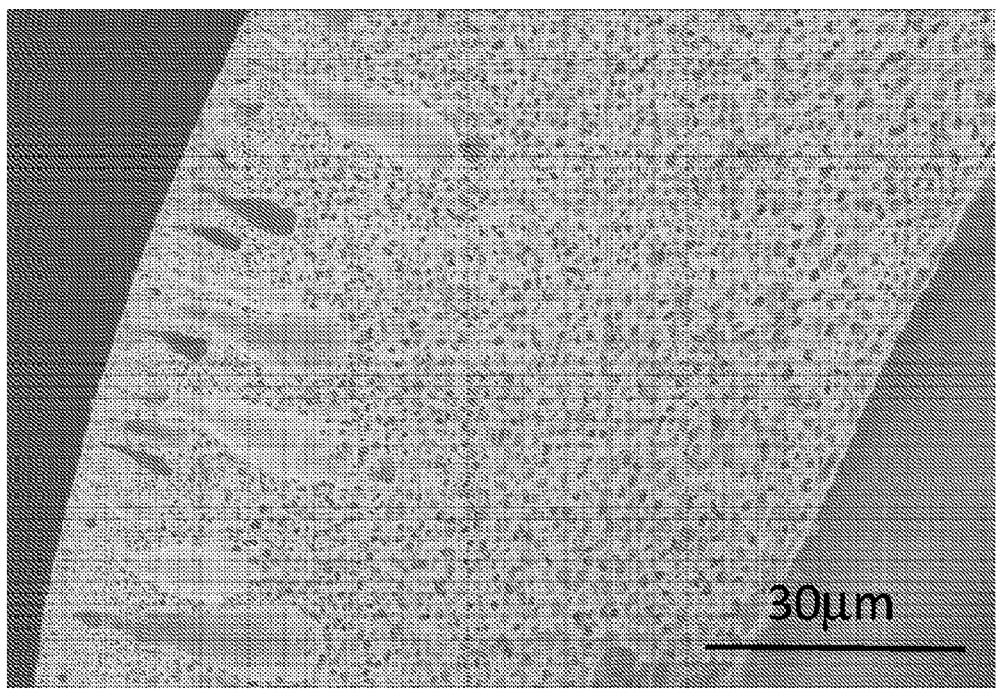
Figure 2C:
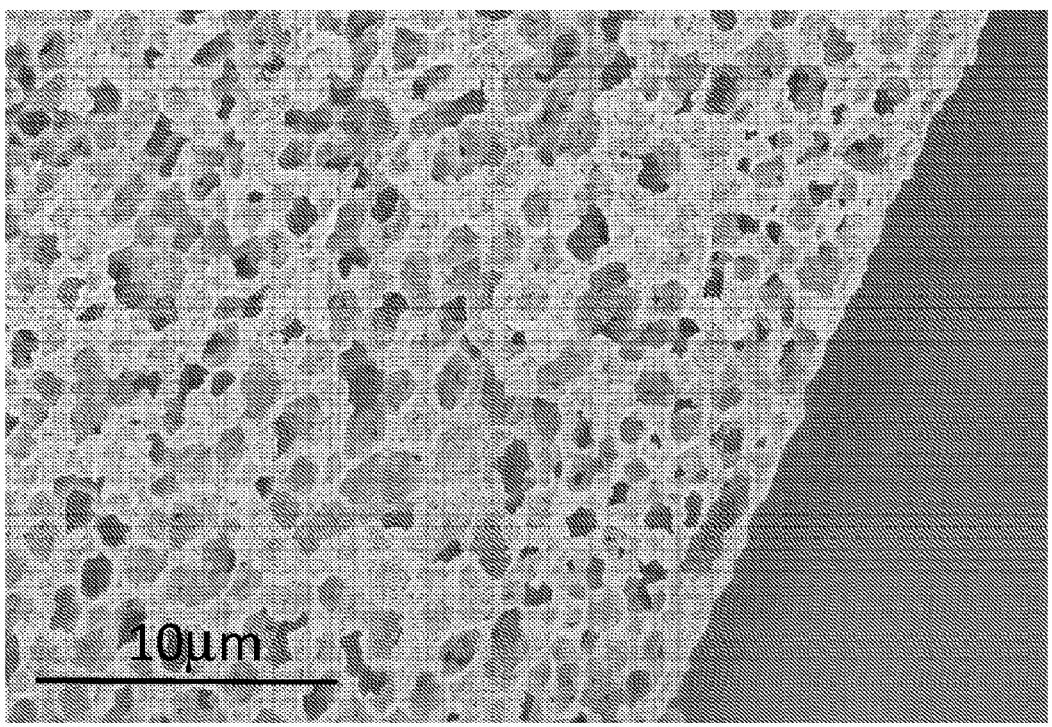
Figure 2D:
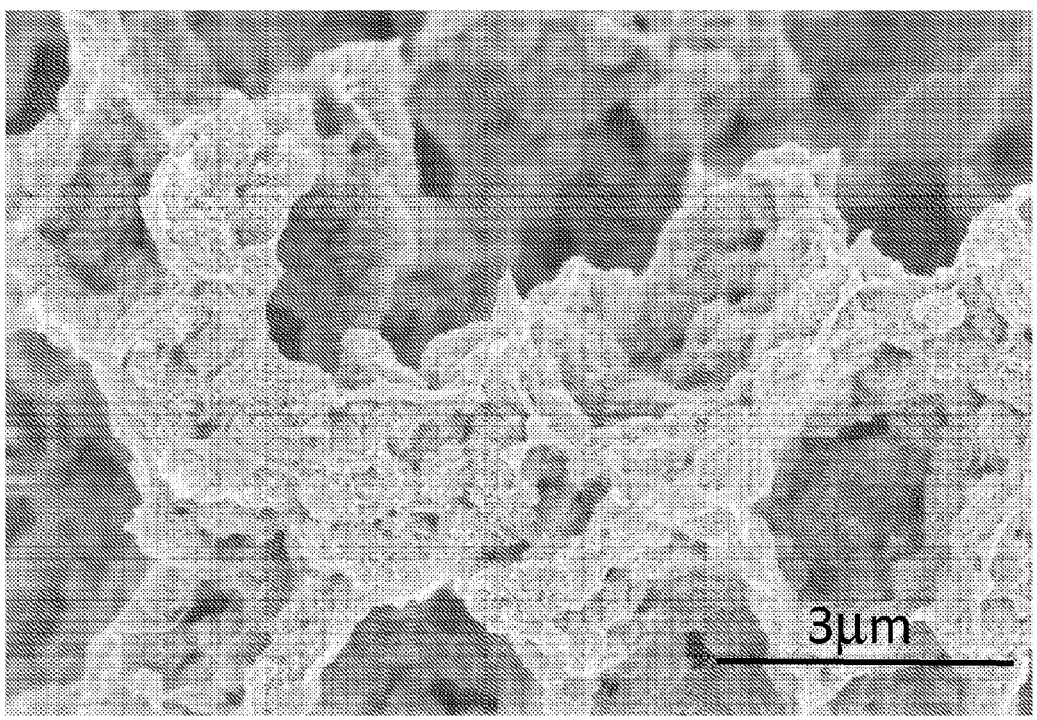
Figure 3:
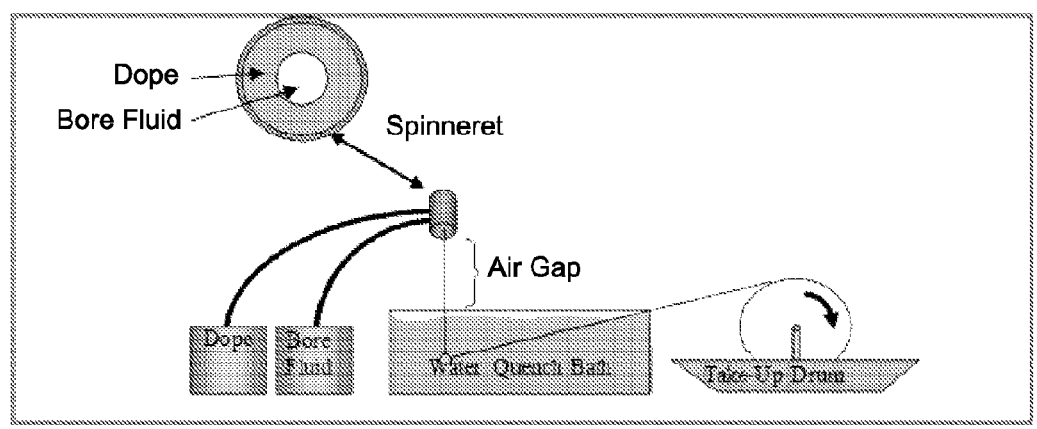
FIG. 3 illustrates schematic of a fiber spinning process, in accordance with an exemplary embodiment of the disclosure.

A nonlimiting example of the hollow fiber is shown in FIGS. 2A-2D. The SEM image of a hollow fiber, with the wall and lumen displayed, is shown in FIG. 2A. An expanded view of the wall of the hollow fiber is shown in FIG. 2B, and a close-up of the wall, demonstrating the mesopores of the hollow fiber, is shown in FIG. 2C. A close-up view of the mesopores of the hollow fibers is shown in FIG. 2D. The asymmetric porosity of a hollow fiber can be seen in FIG. 2B, where the pore size decreases noticeably from the lumen side to the external surface The hollow fiber can be prepared by any method used to prepare hollow fibers. One method that can be used can be a dry-jet wet-quench fiber spinning process. Spinning techniques disclosed in U.S. Pat. No. 8,999,037, and in Koros, W. J.; Fleming, G. K. Review: Membrane-based gas separation, *Journ. Memb. Sci.,* 1993, 83, 1-80 can be applied, and are incorporated herein by reference. FIG. 3 is a nonlimiting example of the spinning process. The method can include preparing a polymer dope, where the dope comprises the fluorinated polymer, a solvent, and a non-solvent. The polymer dope, which can also be described as a homogeneous polymer solution, can be fed through a co-annular die or spinneret along with a bore fluid, passed across an air-gap, and into a water quench bath before being taken up on a drum. The rate of take-up on the drum can be controlled to establish a draw rate. The resulting fibers can be immersed in water, then washed with methanol and hexanes, and dried to give the hollow fibers.

The polymer dope can comprise the polymer, a solvent, and a non-solvent. The polymer can be as described above. The solvent can be polar aprotic solvent. The solvent can be a polar amide solvent. The solvent can be dimethyl acetamide (DMAc), dimethylformamide (DMF) or n-methylpyrrolidone (NMP), preferably DMAc. The non-solvent can be an aqueous ionic solution, such as water and a salt. The non-solvent can include an alkali or alkaline earth halide salt, such as chloride salt. The non-solvent can include lithium chloride.

The bore solution can be the solvent and the non-solvent of the polymer dope. The solvent and non-solvent can be in the same ratio as in the polymer dope.

The polymer dope can comprise about 5 to 40 wt % polymer, preferably about 10 to about 35 wt % polymer, or about 20 to about 35 wt % polymer. The polymer dope can contain about 2 to about 10% wt non-solvent, or about 3 to about 7 wt % non-solvent. The polymer dope can contain about 60 to about 95 wt % polar aprotic solvent about 65 to about 90 wt % polar aprotic solvent, or about 70 to about 85 wt % polar aprotic solvent.

The disclosure for the hollow fiber membrane also includes a film coating on at least one of the outer (or external) surface or the lumen side of the hollow fiber. The film coating can be on the outer surface of the hollow fiber. The film coating can be on the lumen surface of the hollow fiber. The film coating can be on both the outer surface and the lumen surface of the hollow fiber, and does not need to be the same material on both the outer and the lumen surface. The film coating can be a perfluoropolymer, preferably a nonporous perfluorinated polymer film. The perfluoropolymer can contain a polytetrafluoroethylene polymer or polytetrafluoroethylene copolymer. The perfluoropolymer can comprise polytetrafluoro-ethylene (PTFE). The perfluoropolymer can be described as a high free volume perfluoropolymer, and can have a fractional free volume greater than 0.2. The term non-porous does not mean non-permeable, and in fact the perfluoropolymer film should be permeable to gases, such as nitrogen and carbon dioxide.

The film coating can have an average thickness of between 10 and 500 nanometers. The film coating can have an average thickness of at least about 25 nanometers, at least about 30 nanometers, at least about 40 nanometers, at least about 50 nanometers, at least about 60 nanometers or at least about 75 nanometers. The film coating can have an average thickness of less than about 500 nanometers, less than about 400 nanometers, less than about 300 nanometers, less than about 200 nanometers, or less than about 150 nanometers. The film thickness can be about 50 to about 200 nanometers, or about 75 to about 150 nanometers.

The film coating can be applied to the hollow tubes by dissolving the perfluoropolymer in a solvent, preferably a fluorosolvent; casting the solution of the hollow fiber, and evaporating the solvent to form a continuous thin film layer on the surface. Preferably, prior to coating the film, the pores of the hollow fiber are first treated with a solvent, preferably a protic solvent, such as methanol or water, or a combination thereof.

Figure 4A:
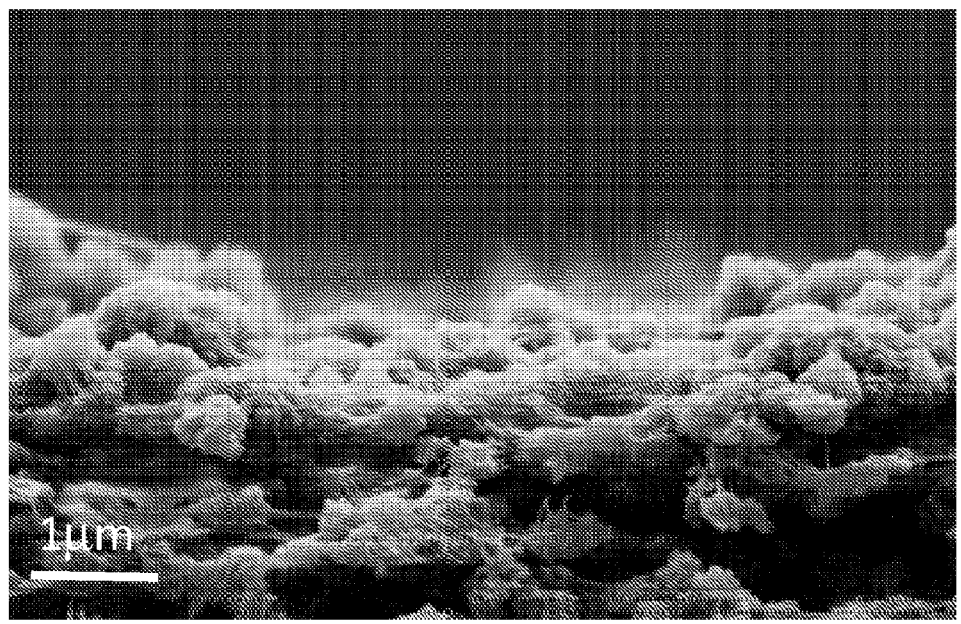
FIGS. 4A and 4B illustrate SEM images of mesoporous hollow fiber membranes, in accordance with an exemplary embodiment of the disclosure.
Figure 4B:
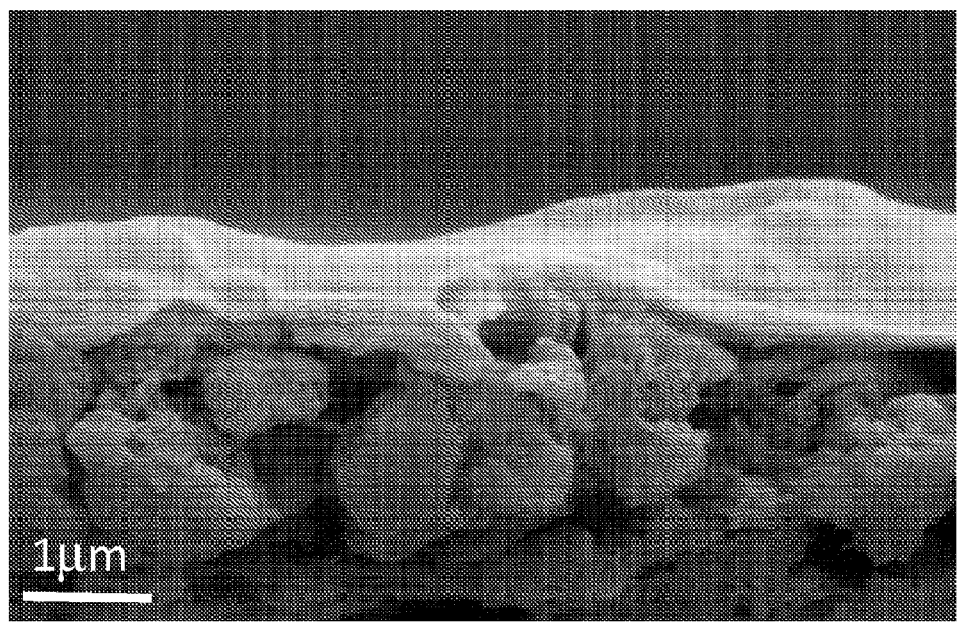

A nonlimiting example of the hollow fiber membrane containing a hollow fiber and a film coating is displayed in FIGS. 4A-4B. FIGS. 4A and 4B demonstrate the surface of a hollow fiber without film coating (FIG. 4A) and with a film coating (FIG. 4B.)

The hollow fibers membranes can then be described as having each of the characteristics of inner diameter, outer diameter, wall thickness, pore size, and a film thickness, as set forth above. For example, a hollow fiber membrane can include the mesoporous hollow fiber having a hydrophobic perfluorinated polymer, a film thickness of 50 to 200 nanometers, an inner diameter of about 75 to about 200 micrometers, an outer diameter of about 150 to about 400 micrometers, a wall thickness of about 25 to about 100 micrometers, and an average pore diameter of about 0.05 to about 3 micrometers.

The hollow fiber membrane of the current disclosure can be used in a variety of applications. One aspect is the delivery and solubilization of a gas into a liquid. A gas can be pressurized into the lumen of the hollow fiber membrane, where it can diffuse through the pores of the hollow fiber and permeate through the nonporous film. The effect can be the delivery of microscale size bubbles of a gas that enters and easily dissolves into the liquid, by virtue of the very high effective surface area. A liquid residing on the outside of the hollow fiber membrane can be solubilized with the gas, and can in fact be saturated with the gas, under conditions that traditional gas solubilization equipment fails to achieve. Thus, the hollow fiber membranes can be utilized in methods for gas solubilization, and in constructing contactors or devices for the same purpose.

The disclosure then includes a method for solubilizing a gas in a liquid. In an embodiment, the method can include providing a hollow fiber membrane containing a porous hollow fiber and a film coating, contacting at least a portion of the hollow fiber with a pressurized gas and contacting at least another portion of the hollow fiber with a liquid. For example, one portion contacting the pressurized gas could be the lumen, and the other portion contacting the liquid could be the outer surface. The method can include providing a hollow fiber membrane containing a porous hollow fiber and a film coating. The porous hollow fiber can have a lumen extending through the fiber, an inner diameter within the lumen, an outer diameter across the fiber, and a wall thickness. The film coating can be a non-porous perfluorinated film. The film can coat the lumen of the hollow fiber, or can coat the outer surface of the hollow fiber, or both. The method can include contacting a pressurized gas through the lumen of the fiber membrane and contacting a liquid with outer shell of the fiber membrane, wherein the pressurized gas permeates the perfluorinated film and diffuses through the porous hollow fibers to solubilize within the liquid.

The hollow fiber membrane, hollow fiber, and film coating disclosed in this method are as described above.

The gas contacting the lumen can be any gas. The gas can be air, oxygen, nitrogen, carbon dioxide, noble gases, halogen gases, or combinations thereof. The gas can be air, oxygen, nitrogen or carbon dioxide. The gas can be air or oxygen. The gas can be nitrogen or carbon dioxide. The gas can be carbon dioxide. The hollow fiber membranes can accept substantial pressure increases. The gas in the hollow fiber can be at a pressure of greater than about 1 atmosphere, greater than about 2 atmospheres, greater than about 3 atmospheres, or greater than about 4 atmospheres. The gas can be up to 12 atmospheres, or up to 10 atmospheres. The gas in the hollow fiber can be between about 1 atmosphere and 10 atmospheres, or between about 1 and about 8 atmospheres, or between about 2 and about 8 atmospheres.

The liquid can be any liquid compatible with the perfluorinated hollow fiber coatings and membranes. Preferably the liquid is a polar protic solvent. The liquid can be water or alcohol, such as methanol, ethanol, propanol, butanol, etc. or a combination thereof. The liquid can be water or ethanol, or both. The liquid can be water.

The liquid can be at any temperature above the freezing point of the solution. One of skill in the art would recognize that gases have a higher solubility in colder liquids, and thus higher concentrations of gases can typically be achieved in colder liquids. However, the method is not necessarily limited to colder temperatures, as other process conditions may require a higher temperature. The temperature of the liquid can be near the freezing point of the solution, greater than about 5° C. above the freezing point of the solution, or greater than about 10° C. above the freezing point of the solution. Under some conditions, the temperature can be between about 10° C. and about 40° C.

While the method above has been described as having the gas on the lumen side and the liquid on the outer surface of the hollow fiber, the method and equipment is not so limited. The liquid can also be passed through the lumen of the hollow fiber membranes, and the gas can be pressurized on the outside of the hollow fiber membranes.

The method disclosed above includes at least one hollow fiber membrane. However, bundles of hollow fiber membranes can be used to increase the rate of solubilization of a gas into a liquid. The bundle can be assembled into a contactor, which can be used in a method for solubilizing a gas into a liquid. Thus, an aspect of the disclosure can include a method for solubilizing a gas in a liquid using a contact module by providing a hollow fiber membrane contact module including a bundle of mesoporous hollow fibers. Each of the hollow fibers can have an outer surface and an inner lumen, and each of the hollow fibers can have a perfluorinated compound and a non-porous perfluorinated film. The non-porous perfluorinated film can cover either the inner lumen or the outer shell of the hollow fibers, or both. A shell can surround the bundle of porous hollow fibers, where a shell-side is defined the shell and outer surfaces of each of the hollow fibers, and a lumen side is defined by the inner lumen of each of the hollow fibers. The method can include contacting a pressurized gas with the lumen side of the contact module; and contacting a liquid with the shell side of the contact module, such that the pressurized gas permeates the perfluorinated films and diffuses through the porous hollow fibers, thus solubilizing within the liquid on the shell side of the contact module. The hollow fiber membrane, hollow fiber, film coating, gas, liquid, and operating conditions in this method are as described above.

The disclosure also includes a device that is the contactor (or contact module), and a system for solubilizing a liquid with a gas using the contactor. The contactor can include a bundle of mesoporous hollow fiber membranes, each of the hollow fibers membranes having an outer surface and an inner lumen, and each comprising a perfluorinated compound and a non-porous perfluorinated film, as described above. The non-porous perfluorinated film covers at least one of the outside surface or the lumen surface of the hollow fiber, or both. The contactor can include a shell surrounding the bundle of mesoporous hollow fibers, a shell side defined by the shell and outer surfaces of each of the hollow fibers, and a lumen side defined by the inner lumen of each of the hollow fibers.

A system for solubilizing a liquid with a gas can include a contactor, a gas source for supplying pressurized gas to one side of the contact module, and a liquid source for supplying liquid to the other side of the contact module. For example, the gas source can be supplied to the lumen side of the contactor, and the liquid can be supplied to the shell side of the contactor.

Figure 5A:
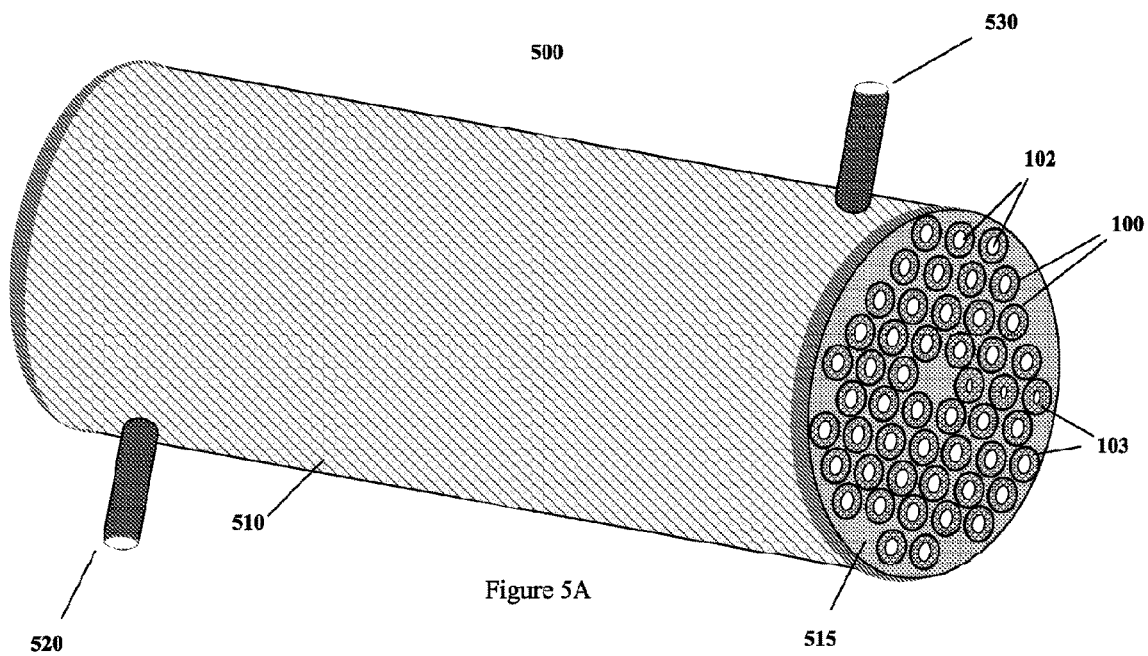
FIGS. 5A and 5B illustrate a schematic a contactor, in accordance with an exemplary embodiment of the disclosure.
Figure 5B:
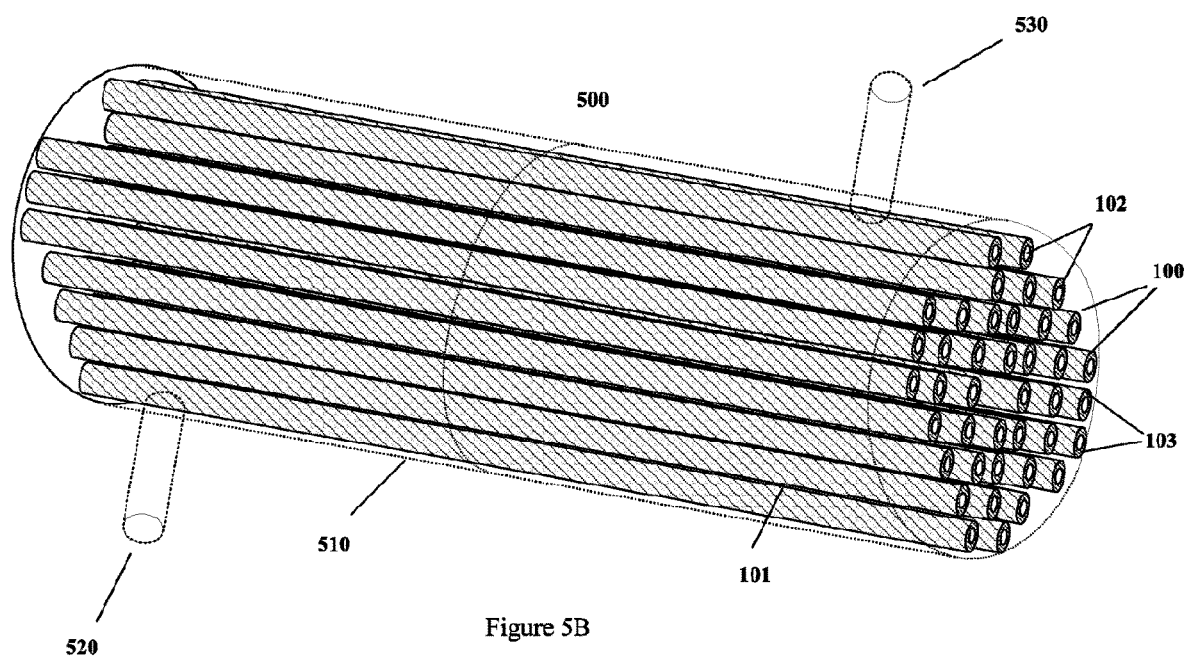

FIGS. 5A and 5B display a schematic representation of a contactor constructed with hollow fiber membranes. Contactor 500 contains a shell 510 shown in FIG. 5A and displayed as transparent in FIG. 5B, using dotted lines to indicate the edges of the shell. The shell 510 encases the bundle of hollow fiber membranes 100. The hollow fiber membranes include a lumen 102, a porous wall 103, and a film layer (not shown). The outer surface 101 of the hollow fiber membranes can be in contact with the shell-side of the contactor, while the lumens of the plurality of hollow fiber membranes can represent the lumen-side of the contactor. The plurality of hollow fiber membranes can be substantially aligned and arranged as a bundle or splayed. The ends of the bundle can be potted or embedded in a binding material 515, which effectively interconnects the lumen of adjacent fibers. The binding material 515 can be any binding material, such as an epoxy resin. The shell can contain at least two ports, 520 and 530, which can serve as an inlet and an outlet for the flow of material on the shell-side of the hollow fiber membranes 100. In operation, as a non-limiting example, the contactor can be pressurized on the lumen side with a gas, and a liquid can be fed through one port 520, flow across the bundle of hollow fiber membrane and solubilize the air coming through the porous walls 103 of the fibers, and exit via another port 530. The flow of gas through the lumen can be restricted to allow only passage radially through the walls of the hollow fiber, or can be allowed to flow through the lumen to the other side, such as during gas flow exchange, serial operation of multiple contactors in series, regulated gas flow through control valves, or other regulated times as controlled by process parameters.

EXAMPLES

Preparation of Hollow Fiber

Poly(vinylidene fluoride) (PVDF) was supplied from Arkema. Dimethylacetamide (DMAc) and lithium chloride (LiCl) was supplied from Alfa Aesar. Teflon AF 2400 is supplied from DuPont and FC-72 electronic liquid is supplied from 3M.

Figure 6A:
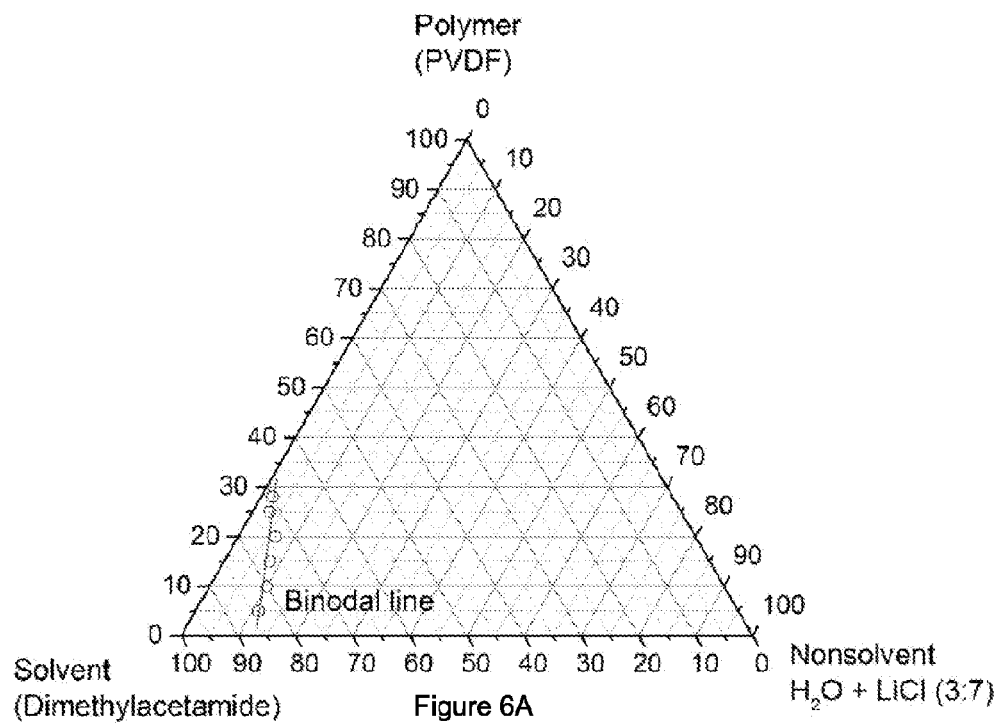
FIGS. 6A and 6B illustrate ternary diagrams for PVDF, DMAc and a 3:7 $H_2O$:LiCl solutions, in accordance with an exemplary embodiment of the disclosure.
Figure 6B:
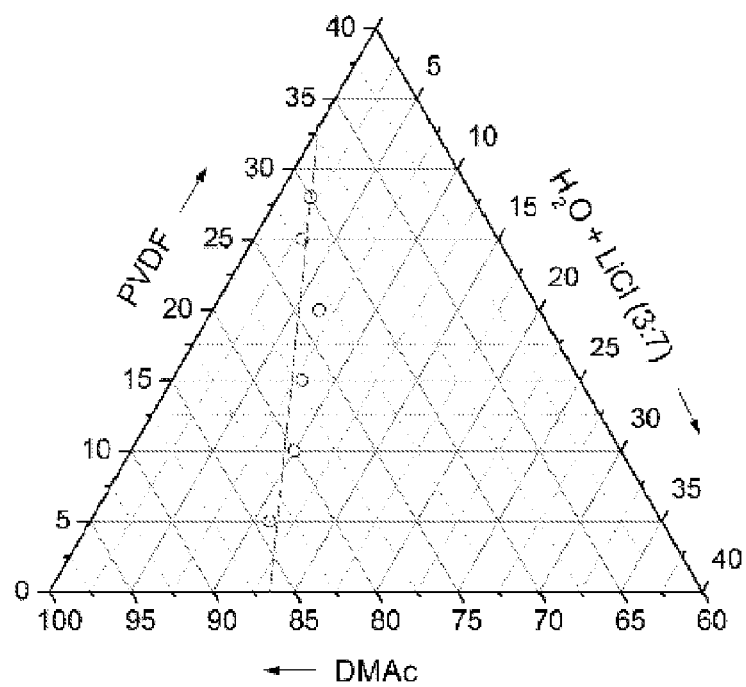

The polymer dope was prepared with PVDF, DMAc and a 3:7 $H_2O$:LiCl solution, according to the bimodal line in the ternary diagrams shown in FIGS. 6A and 6B. The polymer hollow fiber support was formed by a dry jet wet-quench fiber spinning method discussed above. A homogeneous polymer solution was extruded through a co-annular die and phase separated through non-solvent coagulant. Bore fluid with specific mixing ratio between solvent and non-solvent was coextruded. The phase separated fiber was collected at spinning drum with specific draw ratio. The spun fibers were soaked in water for three days with daily water change, and washed with methanol and hexanes 3 times each before drying. The fibers were further dried at 75° C. under vacuum for 1 day to remove residual solvent. The PVDF polymer dope composition is shown in Table 1. The variables used in the spinning and drawing are shown in Table 2.

TABLE 1

| Composition | wt % |
|---|---|
| PVDF | 25 |
| DMAc | 71.5 |
| Water | 1.05 |
| LiCl | 2.45 |

TABLE 2

| Bore fluid composition (w/w) | 79/21 (DMAc/Water) |
|---|---|
| Core flow-rate (ml/h) | 240 |
| Bore flow rate (ml/h) | 160 |
| Air gap (cm) | 30 |
| Take-up rate (m/min) | 30 |
| Spinning temperature (° C.) | R.T. |
| Quench bath temperature (° C.) | 50 |

Figure 7A:
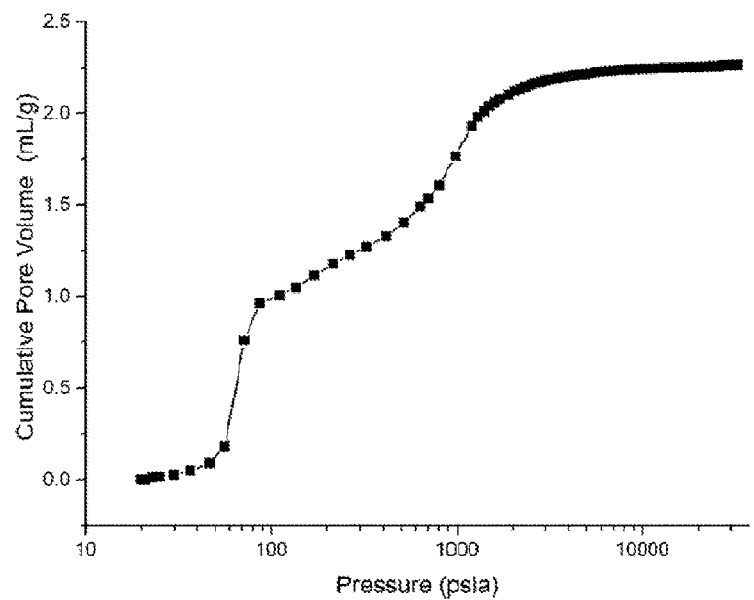
FIGS. 7A and 7B illustrate mercury porosimetry data for a mesoporous hollow fiber, in accordance with an exemplary embodiment of the disclosure.
Figure 7B:
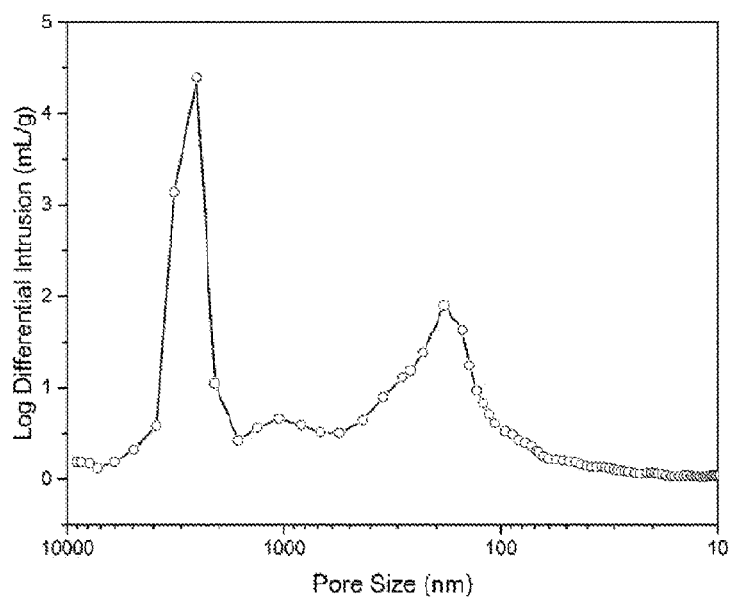
Figure 8:
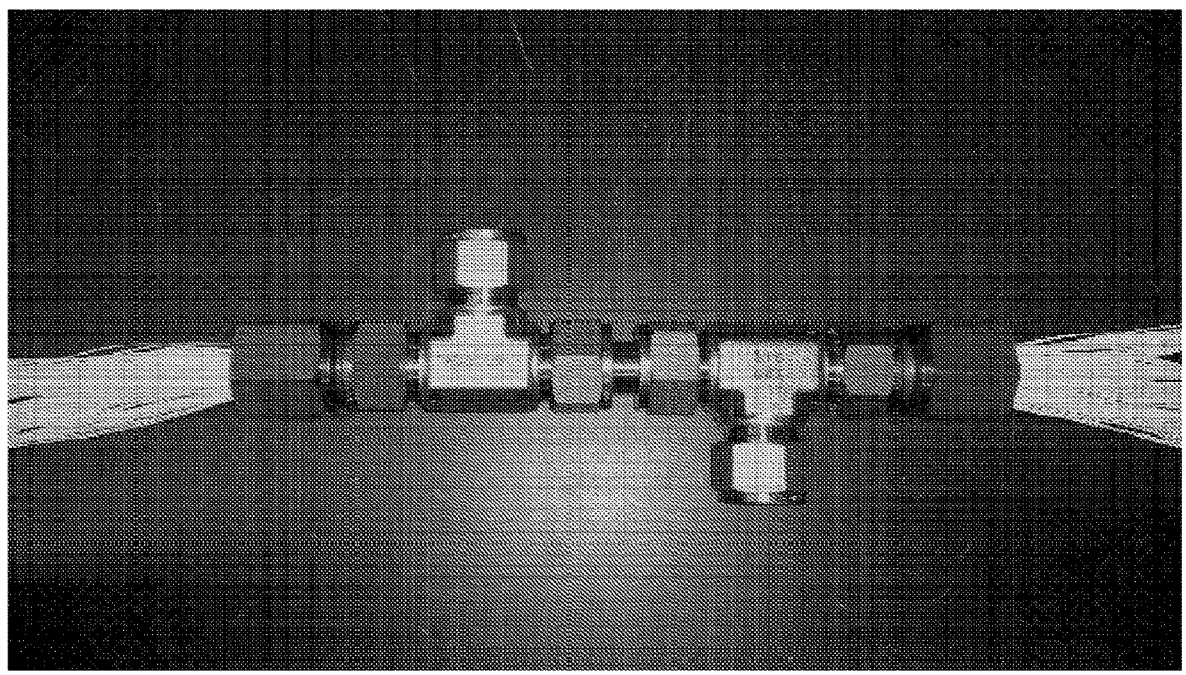
FIG. 8 illustrates standard tube and shell prototype for carbonation testing, in accordance with an exemplary embodiment of the disclosure.

Mercury Porosimetry was conducted on a hollow fiber to determine cumulative pore volume of a hollow fiber and the median pore diameter and pore distribution. Plots of cumulative pore volume v. pressure and Log differential Intrusion v. pore size are shown in FIGS. 7A and 7B Formation of Coating Film on Lumen Side and Construction of Prototype Carbonator Dried PVDF fibers were assembled into standard shell and tube modules (FIG. 8). Number of fibers used were varied from 1 to 300. A thin Teflon AF 2400 layer was created in the lumen (i.e., bore) side of PVDF fiber via post-treatment technique. Teflon AF 2400 pellets were first dissolved in FC-72 in 1 wt %. Fibers were initially treated with methanol for 30 minutes and water for 1 hour to fully saturate the pores with water. Subsequently, polymer solution (Teflon AF 2400 in FC-72) was cast over lumen side of the fiber via fixed flow rate using syringe pump. To flush out residual solution and form a continuous thin film layer, nitrogen was swept for 3 hours through lumen side. The module was further dried at 75° C. under vacuum for 1 day to completely remove residual solvents.

Formation of Coating Film on External Side

Dried PVDF fibers were dip-coated in a Teflon AF 2400 solution. Fibers were soaked in methanol for 30 minutes, water for 30 minutes, and then dipped into a 1 wt % solution of Teflon AF 2400 in FC-72 and drawn out of the solution at a rate of 10 inches/min. the fibers were then dried at room temperature for 3 hours, then for 12 hours at 60° C. under vacuum.

Measurement of Gas Permeance

A single fiber of a PVDF support and a single fiber membrane of Teflon AF 2400/PVDF, with Teflon AF2400 coated on the outside of the hollow fiber, were pressured with a gas at 110 psi and 22° C., and the permeance of each measured. The results are shown in Table 3.

TABLE 3

| Module | Gas | Permeance (GPU) |
|---|---|---|
| PVDF support (Single fiber) | $N_2$ | 16000 |
| Teflon AF 2400/PVDF (Single fiber) | $CO_2$ | 7600 |
| | $N_2$ | 1750 |

Carbonator Testing

Figure 9:
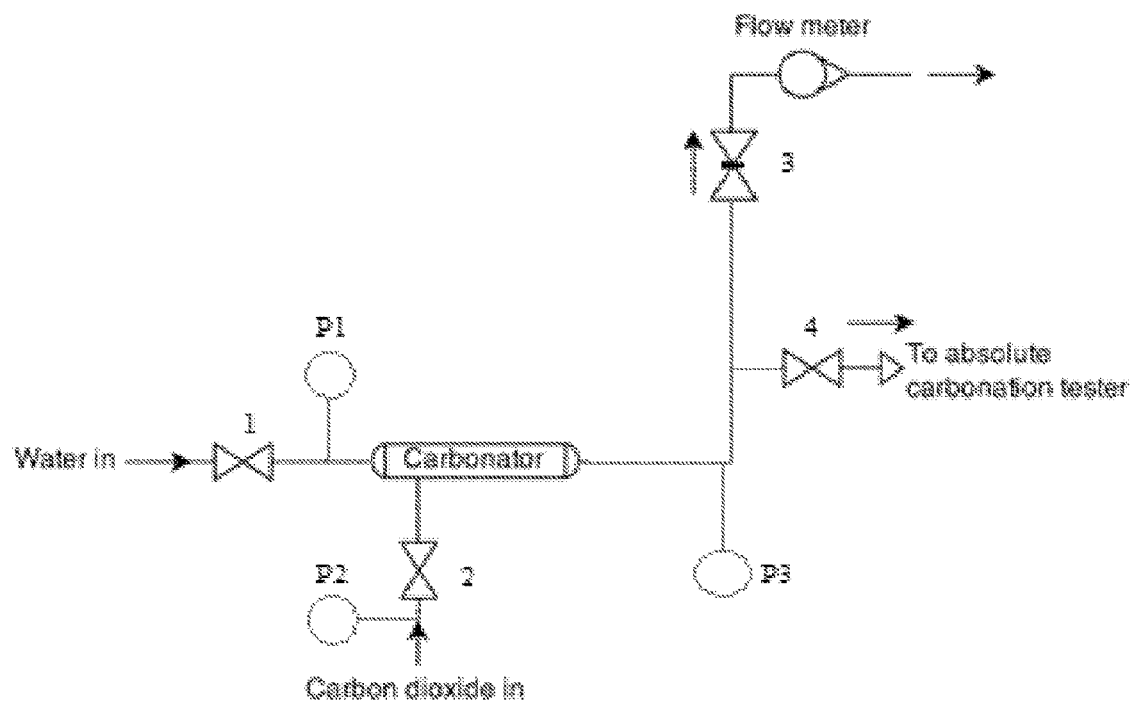
FIG. 9 illustrates a process diagram for carbonator testing, in accordance with an exemplary embodiment of the disclosure.

Using the process diagram in FIG. 9, the following procedure was used to demonstrate carbonation using the prototype carbonator.
1. Set the water and $CO_2$ to the desired pressures.
2. Set the water to the desired flowrate
   a) Start with valves 1 and 3 open and all other valves closed
   b) Adjust valve 1 to set the incoming water pressure (P1)
   c) Adjust valve 3 to set the outlet water pressure (P3)
   d) Measure the flowrate using a timer and the volume of water
   e) Adjust valve 1 and 3 to vary P1 and P3 and generate the flowrate and pressure drop performance
3. Set the $CO_2$ to the desired flowrate
   a) Start with valves 2 and 3 open and all other valves closed
   b) Adjust valve 2 to set the incoming $CO_2$ pressure (p2)
   c) Adjust valve 3 to set the outlet $CO_2$ pressure (p3)
   d) Measure the $CO_2$ flowrate using a timer and the displaced volume of water
4. Set the water and $CO_2$ to the desired flowrate
   a) Flow step 2 to set the water flow rate
   b) Adjust valve 2 to set the incoming $CO_2$ pressure (p2)
5. Pressurize the absolute carbonation tester with $CO_2$ to the same pressure as the water
6. Connect to absolute carbonation tester to the connector
7. Close valve 3 and open valves 4 and adjust the absolute carbonation tester and vent the absolute carbonation tester until it is filled
8. When the carbonated water reaches the top of the cylinder close valves 4 and absolute carbonation tester
9. Disconnect the absolute carbonation tester and take a carbonation reading.

Figure 10:
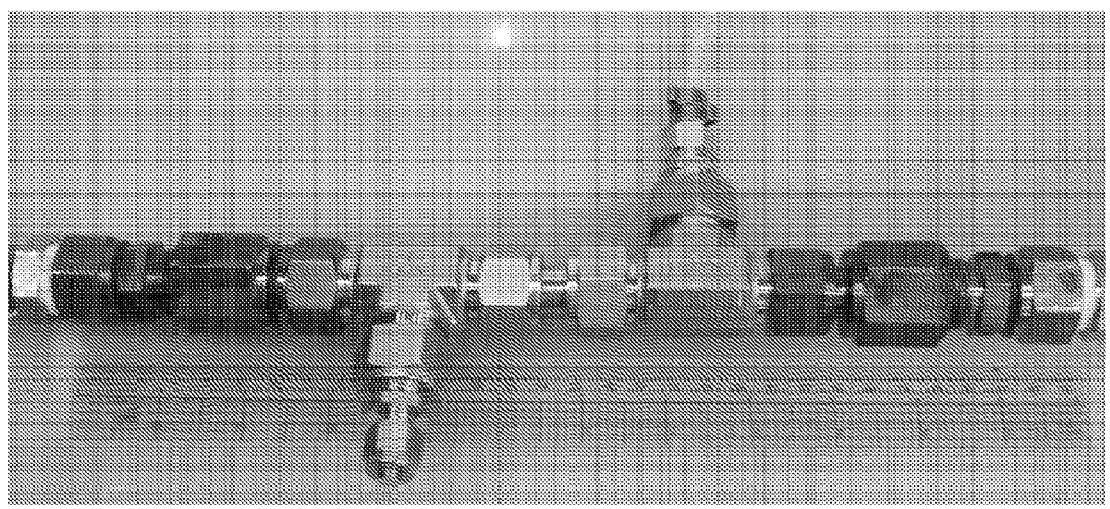
FIG. 10 illustrates a prototype carbonator for demonstrating carbonation in solutions, in accordance with an exemplary embodiment of the disclosure.
Figure 11:
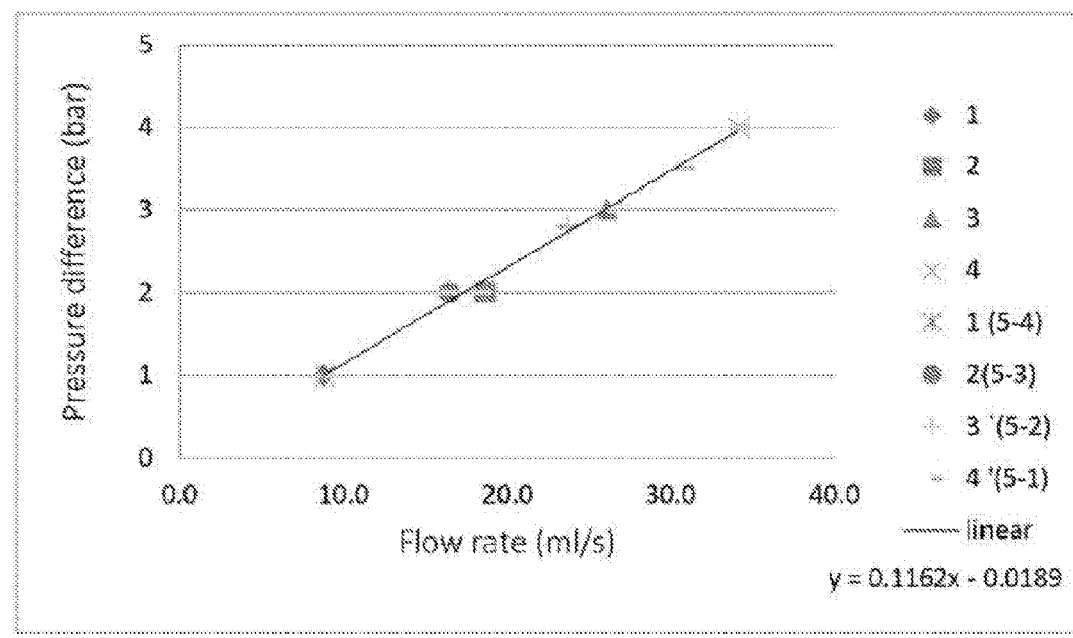
FIG. 11 illustrates pressure difference versus flowrates for a prototype carbonator, in accordance with an exemplary embodiment of the disclosure.

Prototype carbonator (FIG. 10) was tested to evaluate the flow and carbonation concentration rates. Various inlet and outlet pressure were tested. FIG. 11 illustrates the flowrate due to the inlet and outlet pressure variation. The flow rate near 30 ml/sec obtained for four bar pressure difference that had obtained by controlling the inlet pressure to four bars and outlet pressure to zero bar as well as five bars inlet pressure and one bar outlet pressure. Indeed, as the pressure difference increased, the flow rate also increased.

Figure 12:
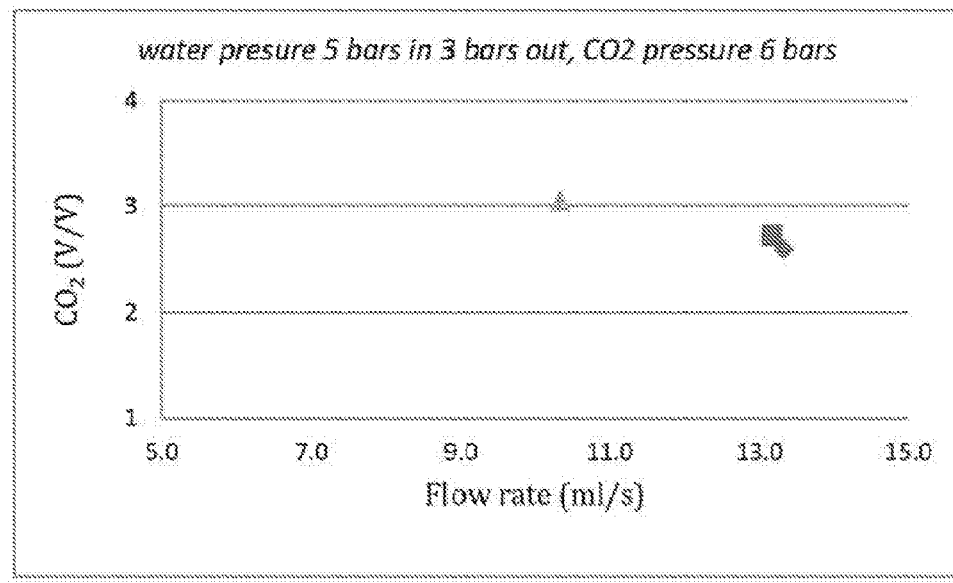
FIG. 12 illustrates dissolved carbonation of a carbonation system, in accordance with an exemplary embodiment of the disclosure.
Figure 13:
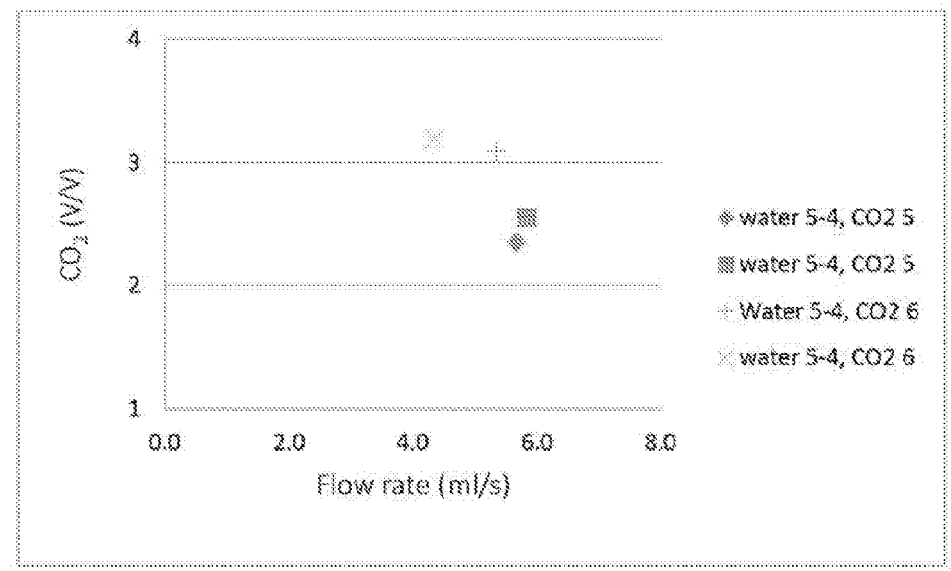
FIG. 13 illustrates dissolved carbonation of a carbonation system, in accordance with an exemplary embodiment of the disclosure.

FIG. 12 illustrates the carbonation rate obtained during the test of prototype at various flowrate. The water inlet and outlet pressure was adjusted to five and three bars while the CO2 pressure was 6 bars. Dissolved $CO_2$ concentration was measured for water inlet and outlet pressures of 72.5 and 43.5 psi and $CO_2$ pressure of 72.5 psi, as shown in FIG. 12. The plot indicates that as the flowrate decreases, the carbonation rate increases. FIG. 13 illustrates the inlet water pressure of five bars and outlet pressure of four bars and $CO_2$ inlet pressure of five and six bars. Dissolved $CO_2$ concentration was measured for water inlet and outlet pressure of 72.5 and 58.0 psi and $CO_2$ pressure of 72.5 and 87.0 psi. It illustrates the increases in $CO_2$ pressure increases the carbonation rate.

EMBODIMENTS

Additionally or alternatively, the disclosure can include one or more of the following embodiments.

Embodiment 1

A hollow fiber membrane, comprising mesoporous hollow fiber and a non-porous perfluorinated film coating at least one of the outside surface or the lumen surface of the hollow fiber. The mesoporous hollow fiber comprises a lumen extending through the fiber, an inner diameter within the lumen, an outer diameter across the fiber, and a wall thickness.

Embodiment 2

A system for solubilizing a liquid with a gas, comprising a hollow fiber membrane contact module a gas source, and a liquid source. The contact module includes a bundle of mesoporous hollow fiber membranes, each of the hollow fibers membranes having an outer surface and an inner lumen, and each comprising a perfluorinated compound and a non-porous perfluorinated film, wherein the non-porous perfluorinated film covers at least one of the outside surface or the lumen surface of the hollow fiber; and a shell surrounding the bundle of mesoporous hollow fibers, where a shell side is defined as the shell and outer surfaces of each of the hollow fibers, and a lumen side is defined as the inner lumen of each of the hollow fibers. The gas source for supplying pressurized gas to the lumen side of the contact module; and a liquid source for supplying liquid to the shell side of the contact module.

Embodiment 3

A method for solubilizing a liquid with a gas, comprising providing a hollow fiber membrane having a mesoporous hollow fiber, which includes a lumen extending through the fiber, an inner diameter within the lumen, an outer diameter across the fiber, and a wall thickness; and a non-porous perfluorinated film coating at least one of the outside surface or the lumen surface of the hollow fiber. The method includes contacting a pressurized gas through the lumen of the fiber membrane; and contacting a liquid with outer shell of the fiber membrane, wherein the pressurized gas permeates the perfluorinated film and diffuses through the mesoporous hollow fibers to solubilize within the liquid.

Embodiment 4

A method for solubilizing a liquid with a gas, comprising providing a hollow fiber membrane contact module, which includes a bundle of mesoporous hollow fibers, each of the hollow fibers having an outer surface and an inner lumen, and each comprising a perfluorinated compound and a non-porous perfluorinated film, wherein the non-porous perfluorinated film covers at least one of the outside surface or the lumen surface of the hollow fiber; a shell surrounding the bundle of mesoporous hollow fibers, where a shell side is defined as the shell and outer surfaces of each of the hollow fibers, and a lumen side defined as the inner lumen of each of the hollow fibers. The method includes contacting a pressurized gas with the lumen side of the contact module; and contacting a liquid with the shell side of the contact module, wherein the pressurized gas permeates each of the perfluorinated films before diffusing through each of the mesoporous hollow fibers and solubilizing within the liquid on the shell side of the contact module.

Embodiment 5

The membranes, systems, or methods of any of the previous embodiments, wherein the non-porous perfluorinated film covers the inside lumen of the hollow fiber, or the non-porous perfluorinated film covers the outer surface of the hollow fiber.

Embodiment 6

The membranes, systems, or methods of any of the previous embodiments, wherein the mesoporous hollow fiber comprises a perfluorinated compound. The perfluorinated compound can by PVDF.

Embodiment 7

The membranes, systems, or methods of any of the previous embodiments, wherein the non-porous perfluorinated film is permeable. The non-porous perfluorinated film can be polytetrafluoroethylene (PTFE).

Embodiment 8

The membranes, systems, or methods of any of the previous embodiments, wherein the non-porous perfluorinated film has a thickness of about 50 to about 200 nm, or about 75 to about 150 nm.

Embodiment 9

The membranes, systems, or methods of any of the previous embodiments, wherein the hollow fiber has an inner diameter of about 50 to about 250 micrometers, or about 75 to about 200 micrometers.

Embodiment 10

The membranes, systems, or methods of any of the previous embodiments, wherein the hollow fiber has an outer diameter of about 100 to about 500 micrometers, or about 150 to about 400 micrometers, or about 150 to about 350 micrometers.

Embodiment 11

The membranes, systems, or methods of any of the previous embodiments, wherein the hollow fiber has a wall thickness of about 20 to about 150 micrometers, or about 25 to about 100 micrometers.

Embodiment 12

The membranes, systems, or methods of any of the previous embodiments, wherein the hollow fiber has an average pore diameter of about 0.05 to about 3 micrometers, or about 0.1 to about 3 micrometers, or about 0.5 to about 3 micrometers.

Embodiment 13

The membranes, systems, or methods of any of the previous embodiments, wherein the pressurized gas comprises air, $CO_2$, or $N_2$, or the pressurized gas comprises $N_2$ or $CO_2$, or the pressurized gas comprises $CO_2$.

Embodiment 14

The membranes, systems, or methods of any of the previous embodiments, wherein the pressurized gas can be at about 1 to about 10 atmospheres, or about 2 to about 8 atmospheres.

Embodiment 15

The membranes, systems, or methods of any of the previous embodiments, wherein the liquid comprises a polar protic liquid, or the liquid comprises water or alcohol, or the liquid comprises water.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

We claim:

1. A system for solubilizing a liquid with a gas comprising:
   a shell containing a bundle of hollow fiber membranes;
   a liquid source; and
   a gas source;
   wherein each hollow fiber membrane comprises:
      a mesoporous hollow fiber comprising a hydrophobic fluorinated polymer; and
      a nanoscopic perfluorinated film;
   wherein the mesoporous hollow fiber has an average pore diameter from about 0.05 to about 3 microns;
   wherein the nanoscopic perfluorinated film has an average thickness from about 25 to about 500 nanometers;
   wherein the mesoporous hollow fiber comprises:
      an outer surface defining an outer diameter of the mesoporous hollow fiber;
      a lumen having an inner surface defining an inner diameter of the mesoporous hollow fiber; and
      an annular wall having a wall thickness extending from the inner surface of the lumen to the outer surface of the fiber; and
   wherein the nanoscopic perfluorinated film at least partially coats one or both of:
      the outer surface of the mesoporous hollow fiber; and
      the inner surface of the lumen;
   wherein the shell has a shell side and a lumen side, the shell side defined by the shell and the outer surfaces of the bundle of hollow fiber membranes, and the lumen side defined by the inner surfaces of the lumens of the bundle of hollow fiber membranes;
   wherein the liquid source is configured to supply a liquid to one of the shell side and lumen side of the shell; and
   wherein the gas source is configured to supply a gas to the other of the shell side and lumen side of the shell.

2. The system of claim 1, wherein the nanoscopic perfluorinated film at least partially coats the outer surface of the mesoporous hollow fibers of the bundle of hollow fiber membranes.

3. The system of claim 1, wherein the shell comprises:
   a first end;
   a second end;
   an inlet port in fluid communication with the shell side of the shell; and
   an outlet port in fluid communication with the shell side of the shell;
   wherein the hollow fiber membranes of the bundle of hollow fiber membranes are substantially aligned along the lengths of the hollow fiber membranes and extend through the length of the shell from the first end to the second end; and
   wherein the first end and the second end of the shell comprise binding material effectively interconnecting the lumen of adjacent hollow fiber membranes.

4. The system of claim 1 further comprising:
   a gas; and
   a liquid initially free of the gas;
   wherein the gas source is configured to supply the gas at a pressure to the lumen side of the shell;
   wherein the liquid source is configured to supply the liquid initially free of the gas to the shell side of the shell; and
   wherein the shell is configured to enable the pressurized gas to diffuse through the pores of the mesoporous hollow fibers and permeate through the nanoscopic perfluorinated film and providing microscale size bubbles of the gas into the liquid such that the liquid subsequently contains at least a portion of the gas.

5. The system of claim 4, wherein the pressurized gas comprises one or both of $CO_2$ and $N_2$.

6. The system of claim 4, wherein the liquid comprises water.

7. The system of claim 4, wherein the nanoscopic perfluorinated film comprises polytetrafluoroethylene (PTFE).

8. The system of claim 4, wherein the nanoscopic perfluorinated film has an average thickness of about 75 to about 150 nanometers.

9. The system of claim 4, wherein the hydrophobic fluorinated polymer comprises polyvinylidene difluoride (PVDF).

10. The system of claim 4, wherein the nanoscopic perfluorinated film has an average thickness of about 50 to about 200 nanometers.

11. The system of claim 4, wherein the average inner diameter of the mesoporous hollow fibers of the bundle of hollow fiber membranes is in a range of from about 75 to about 200 micrometers.

12. The system of claim 4, wherein the average outer diameter of the mesoporous hollow fibers of the bundle of hollow fiber membranes is in a range of from about 150 to about 400 micrometers.

13. The system of claim 4, wherein the average wall thickness of the mesoporous hollow fibers of the bundle of hollow fiber membranes is in a range of from about 25 to about 100 micrometers.

\* \* \* \* \*